(No Model.)
W. H. EDSALL.
JOINT FOR CORNICE POLES.
No. 288,319.                Patented Nov. 13, 1883.
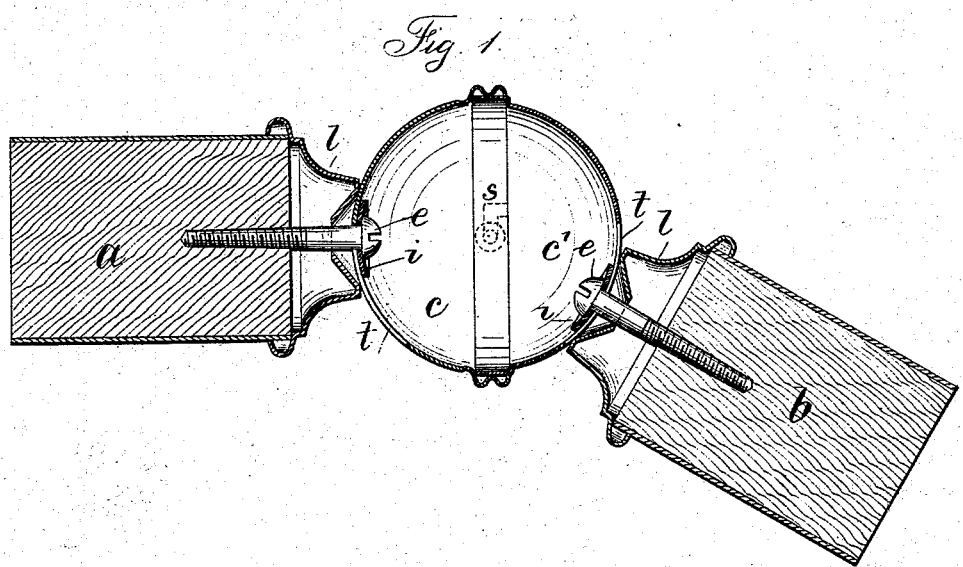
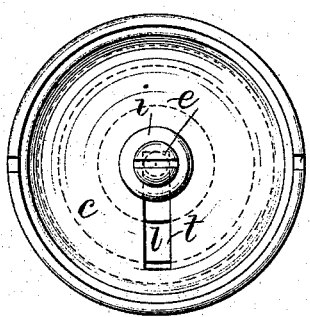
Witnesses
J. Haib
Chas H. Smith
Inventor
William H. Edsall
per Lemuel W. Serrell  atty

UNITED STATES PATENT OFFICE.

WILLIAM H. EDSALL, OF BROOKLYN, NEW YORK.

JOINT FOR CORNICE-POLES.

SPECIFICATION forming part of Letters Patent No. 288,319, dated November 13, 1883.

Application filed July 31, 1882. (No model.)

*To all whom it may concern:*

Be it known that I, WILLIAM H. EDSALL, of Brooklyn, in the county of Kings and State of New York, have invented an Improvement in Joints for Cornice-Poles, of which the following is a specification.

This invention is an improvement in joints for cornice-poles, and is for facilitating the connection between one portion of a cornice and the next where the poles come together at an angle. I combine with the cornice-poles joint-pieces made in two hemispherical parts, slotted and attached to the cornice-poles by screws passing through the slots into said cornice-poles, and I provide means for connecting the joint-pieces together, and I combine with the two slotted hemispherical joint-pieces and their interlocking devices the end pieces to the cornice-poles and the attaching-screws passing through the slots. This joint becomes of a highly ornamental character, as well as being adapted to the various circumstances of use.

In the drawings, Figure 1 is a sectional plan of the cornice-pole, and Fig. 2 is a view of the shell endwise of the cornice.

The poles are of any desired length. Portions $a$ and $b$ are shown as united by the joint $c\ c'$. The joint $c\ c'$ is made in two parts, preferably of sheet metal, and each part is fastened to one end of the cornice-pole $a$ or $b$, and the two parts $c\ c'$ are afterward fastened together. The joint-pieces $c\ c'$ are preferably hemispherical, and there are slots $t$ across each for the passage of the screw $e$, that enters the end of the cornice-pole and fastens to the same the hemispherical joint-piece. The washer $i$, beneath the screw-head, takes a broad bearing upon the inside of the sheet-metal hemisphere. The end of the cornice-pole should be slightly recessed, so that the hemisphere takes an even bearing thereon, and I prefer that an ornamental metal cap, $l$, be applied over the end of the pole between the same and the hemisphere, as shown. Each hemisphere is to be connected to the end of its cornice-pole, and then the hemispheres are to be connected to each other. Any suitable lock may be provided for engaging the two hemispheres. I have shown bayonet-locks at $s$, the same being formed of pins or projections on one part and L-shaped slots in the other. After the parts of the cornice have been connected together one part can be moved so as to stand at any desired angle to the other, because the slots in the hemispherical joint-pieces allow the movement of the attaching-screws along in said slots as the cornice-poles are swung. I have spoken of the joint-pieces $c\ c'$ as hemispherical; but it is to be understood that these joint-pieces may be of any desired ornamental character or shape, and that the two parts may be united by screw-threads bent up in the sheet metal or in any suitable way.

I claim as my invention—

1. The combination, with the cornice-poles, of joint-pieces made in two parts and slotted, attaching-screws passing through such slots into the cornice-poles, and means for connecting the two joint-pieces, substantially as set forth.

2. The combination, with the two slotted joint-pieces and their interlocking devices, of the end pieces to the cornice-poles and the attaching-screws passing through the slots, substantially as set forth.

Signed by me this 25th day of July, A. D. 1882.

W. H. EDSALL.

Witnesses:
GEO. T. PINCKNEY,
CHAS. H. SMITH.